(12) United States Patent
Caesar et al.

(10) Patent No.: US 7,419,524 B2
(45) Date of Patent: Sep. 2, 2008

(54) FILTER SYSTEM

(75) Inventors: Thomas Caesar, Leimen (DE); Renate Tapper, Bensheim (DE); Thomas Schroth, Bobenheim (DE)

(73) Assignee: Carl Freudenberg KG, Weinheim (DE)

(*) Notice: Subject to any disclaimer, the term of this patent is extended or adjusted under 35 U.S.C. 154(b) by 179 days.

(21) Appl. No.: 10/514,751

(22) PCT Filed: Mar. 12, 2003

(86) PCT No.: PCT/EP03/02499

§ 371 (c)(1),
(2), (4) Date: Jul. 7, 2005

(87) PCT Pub. No.: WO03/097214

PCT Pub. Date: Nov. 27, 2003

(65) Prior Publication Data

US 2005/0235618 A1 Oct. 27, 2005

(30) Foreign Application Priority Data

May 15, 2002 (DE) .............................. 102 21 779

(51) Int. Cl.
*B01D 46/12* (2006.01)
*B01D 50/00* (2006.01)

(52) U.S. Cl. .................. 55/482; 55/489; 55/DIG. 31

(58) Field of Classification Search ................ 55/323, 55/385.2, 482, 483, 485, 486, 487, 488, 489, 55/DIG. 31; 95/287; 210/323.1, 488, 489
See application file for complete search history.

(56) References Cited

U.S. PATENT DOCUMENTS

| 3,707,832 | A  | * | 1/1973 | Muller et al. ................ 55/486 |
| 6,280,493 | B1 | * | 8/2001 | Eubank ....................... 55/398 |
| 6,348,077 | B1 | * | 2/2002 | Solberg et al. ............... 55/323 |
| 6,361,577 | B1 |   | 3/2002 | Unrath et al. ................ 55/482 |
| 6,364,923 | B1 | * | 4/2002 | Wiedmeyer et al. ........ 55/385.2 |
| 6,387,164 | B1 | * | 5/2002 | Cheng ........................... 96/66 |
| 6,425,945 | B1 | * | 7/2002 | Cheng ........................... 96/66 |
| 6,576,045 | B2 | * | 6/2003 | Liu et al. ...................... 95/268 |
| 7,144,438 | B2 | * | 12/2006 | Lee et al. ...................... 55/429 |
| 2006/0123753 | A1 | * | 6/2006 | Sugiura et al. ............... 55/482 |

FOREIGN PATENT DOCUMENTS

| DE | 195 02 366 | 8/1996 |
| EP | 0663228 | 7/1995 |
| GB | 2336990 | 11/1999 |

* cited by examiner

*Primary Examiner*—Duane Smith
*Assistant Examiner*—Robert A Clemente
(74) *Attorney, Agent, or Firm*—Davidson, Davidson & Kappel, LLC

(57) ABSTRACT

A filter system includes several filters, particularly a main filter and at least one prefilter, which are disposed one after another and are made of a filter material that is encompassed by frames. The sides of the frame of the main filter and the frame/s of the prefilter/s, which face each other, include connecting elements. The individual filters can be coupled to each other in a form-fitting manner.

5 Claims, 4 Drawing Sheets

FILTER SYSTEM

BACKGROUND

To an increasing degree, clean rooms are required in plants where precision instruments or the requisite parts for such instruments are manufactured. Also, the demands placed on the purity of the incoming and circulating air used in industrial processes are becoming increasingly more stringent. It is essential to have air that is purified of dust and microorganisms, and air filter systems having different designs are used. In this connection, cartridge filters are frequently used, which have a fold pack that is oriented perpendicularly to the direction of flow or a plurality of fold packs arranged in a V-shape, which are inserted into one frame. The fold pack and the frame are sealed from one another by a sealing material. As a fold pack, an insert made of accordian-folded filter paper is used. When working with filters for fine particulate matter, a filter fleece can be inserted as sealing material. However, in the case of filters for suspended particulate matter, plastics, which are mostly processed in liquid form, are used.

The frame gives the filter the requisite stability, protects the fold pack from damage, and allows the filter to be inserted into a receptacle system provided for it. The finished filter, together with the frame, is installed on site in a holding receptacle of an air filter system. The air filter systems frequently have a multistage design and are composed of series-connected filters, for the most part of different filter classes, the separation efficiency of the filters typically increasing in the direction of air flow. When the filters of any one stage are installed in a filter system, in each case in a separate holding receptacle, the filter system must be sized to have equivalent dimensions. This entails higher capital costs as compared to a single-stage system. For this reason, efforts are also directed toward achieving a most compact possible design of the two-stage or multistage filter systems. In practice, in a two-stage filter arrangement, the prefilter and the main filter are installed together in only one filter receptacle. The prefilter is positioned loosely against the main filter, and, once inserted in the filter receptacle, both elements are held securely by the latter. The sealing action between the prefilter and main filter is provided by a peripheral seal that is placed on both filters. Since the service life of the prefilter is typically shorter than that of the main filter, problems arise when replacing the prefilter. The problems are further aggravated in filter systems which are only accessible from one side, since the prefilter and the main filter can only be installed from one and the same side into the holding receptacle.

SUMMARY OF THE INVENTION

An object of the present invention is to provide a filter system which requires only a small amount of installation space, has a compact design, and which facilitates ease of assembly and, respectively, disassembly of individual filters.

The present invention provides a filter system having a plurality of in-line filters of a filter material that is held by frames, in particular having a main filter and at least one prefilter, in that the frame of the main filter and the frame of the prefilter and, alternatively, the frames of the prefilters are provided on their mutually facing sides with fasteners, which allow the individual filters to be coupled to one another in a form-fitting manner. Thus, in accordance with the present invention, a filter cartridge may be placed as a prefilter on a cartridge type main filter, for example, and the two filters fastened together. The coupled together filters form an inherently stable unit. Therefore, it is merely necessary for the main filter to be secured in the filter holding receptacle. The need is eliminated for securing the prefilter separately.

The fasteners may be attached to the filter frame in such a way that they are replaceable. They are preferably designed to be symmetrical with respect to their center plane. Here, double-sided straddling dowels, two-part couplings or the like may be used, for example, which are inserted into corresponding slots, holes or the like in the frames of the filters. Fasteners are preferred which are rereleasable, without the main filter being damaged in the process. In this context, the fasteners themselves may be partially or also completely replaced. Especially beneficial is an approach whereby the fasteners are in two parts and may be fitted into each other.

The present invention may be applied quite beneficially to cartridge-type filters, so-called called filter cartridges.

DETAILED DESCRIPTION

Figure 1:
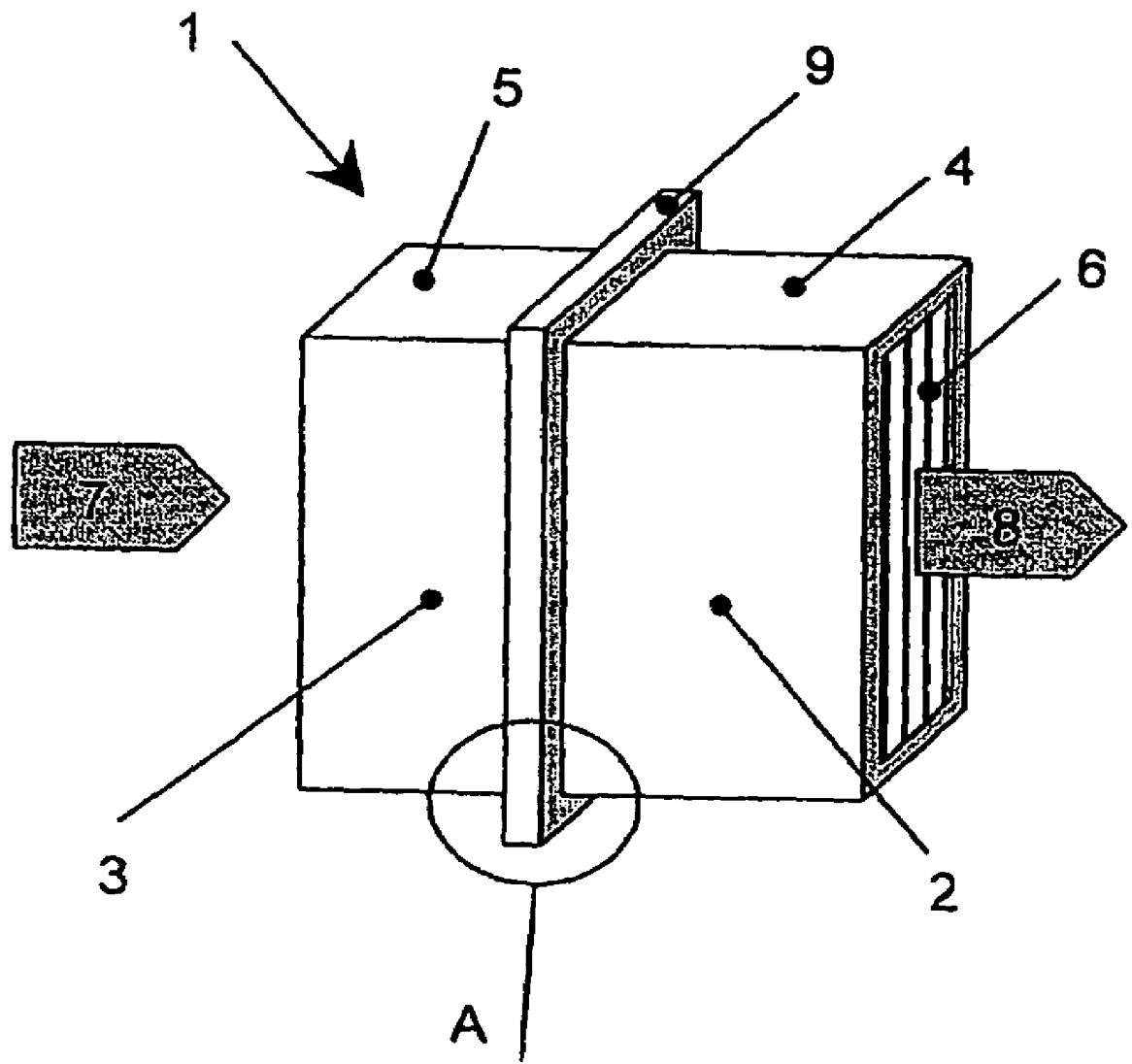
FIG. 1 shows in an oblique view an embodiment of the present invention having a filter cartridge composed of a main filter and a prefilter.

The present invention is explained in greater detail in the following with reference to a plurality of exemplary embodiments. In the enclosed FIG. 1, a filter cartridge 1 composed of a main filter 2 and a prefilter 3 are shown in an oblique view. Both main filter 2, as well as prefilter 3 are enclosed by a frame 4 and 5, respectively. As filter material, accordian-folded filter packs 6 are used. The air flow direction is indicated by arrows 7 and 8. Located on main filter 2 is so-called top holder frame 9, which is used for anchoring the filter pack in a filter system.

Figure 2:
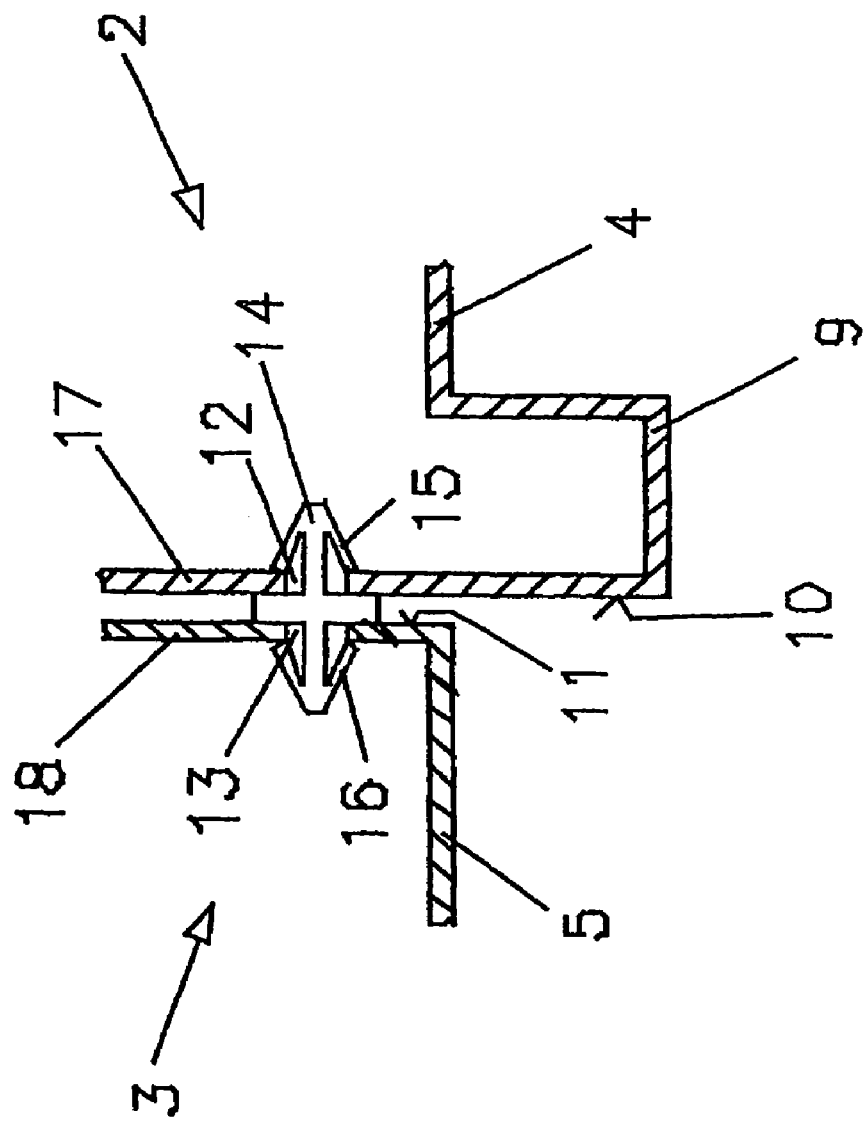
FIG. 2 shows an enlarged sectional view of detail A from FIG. 1.

FIG. 2 is an enlarged sectional view of detail A from FIG. 1. Mutually adjacent sides 10 and 11 of main filter 2 and of prefilter 3 are provided with holes 12 and 13, into which fastener 14 is inserted in a form-fitting manner. In the present example, fastener 14 is composed of a double-sided straddling dowel, whose straddling arms 15 and 16 grip behind walls 17 and 18 of frames 4 and 5 when the dowel is inserted. It is noted that, on the frame periphery for both filters, a multiplicity of straddling dowels 14 is inserted in corresponding openings 12, 13.

Straddling dowel 14 is provided in its axial center plane with spacer washer 19 (FIG. 4) which renders possible a precise mutual correspondence of side surfaces 10 and 11.

Figure 3:
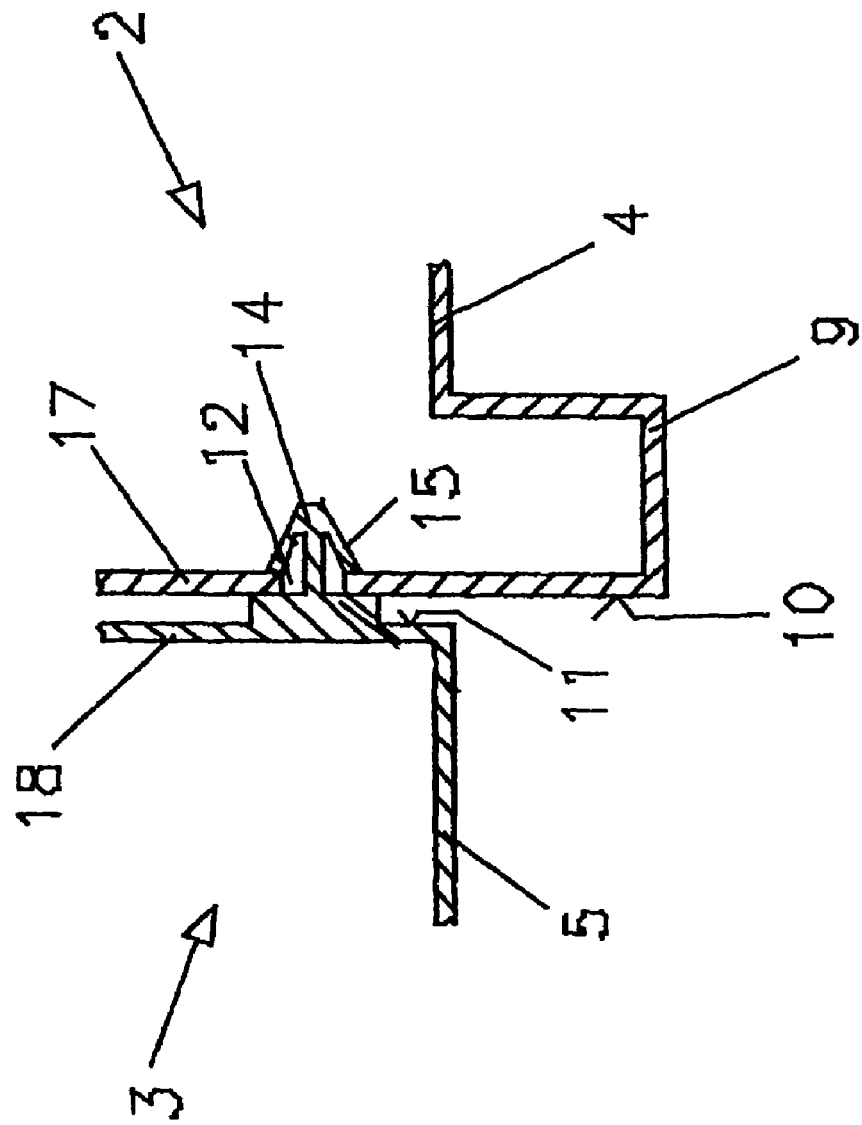
FIG. 3 shows another embodiment of a fastener.

FIG. 3 shows another embodiment of fastener 14 which projects out of wall 18 of frame 5. It is integrated with wall 18, and its straddling arms 15 are inserted through hole 12 and grip behind wall 17.

Figure 4:
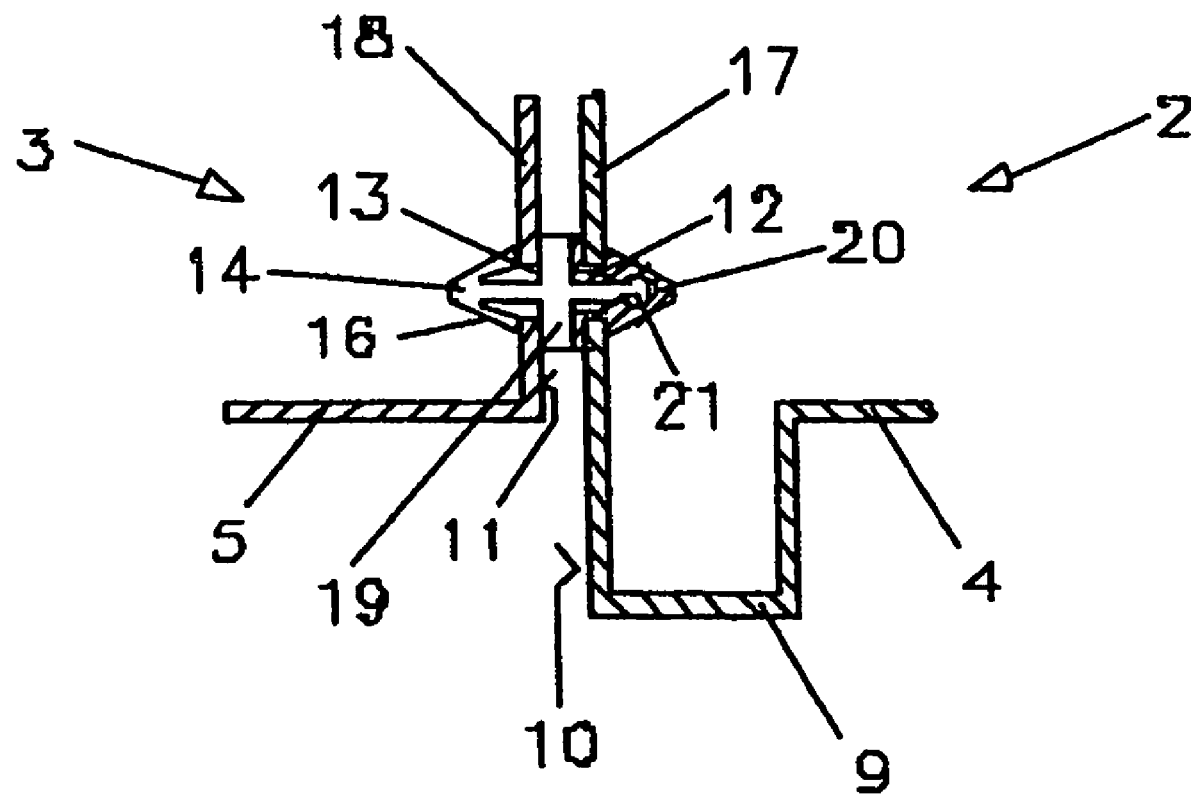
FIG. 4 shows yet another embodiment of a fastener.

FIG. 4 illustrates an especially efficient approach for fastening frames 4 and 5, whereby straddling dowel 14 is inserted into hole 13 of frame 5. Straddling arms 16 present on its one side grip behind wall 18 of prefilter 3. Its opposing side is provided with a protruding connector 21 which may be inserted into a receptacle in a holder part 20. Holder part 20 is made of a slightly elastic material and is inserted as a plug into opening 12 of wall 17 of main filter 2. Thus, fastener 14 has a snap-fastener type of design, and the two frames 4 and 5 are easily fitted together, and, respectively, disconnected again from one another, without any damage to the frames or fasteners 14 occurring in the process.

What is claimed is:

1. A filter system for clean-air rooms, comprising:
a cartridge filter with a plurality of filters connected in series and composed of zigzag-folded filter materials surrounded by a frame, the plurality of filters including a main filter and at least one prefilter, wherein the frame of the main filter and the frame or frames of the at least one prefilter are provided on their mutually confronting side faces with connection elements allowing a form-fitting and releasable coupling of the main filter to the at least one prefilter.

2. The filter system as recited in claim 1, wherein the main filter and the at least one prefilter are coupled to one another to form an intrinsically stable structural unit.

3. The filter system as recited in claim 1, wherein the connection elements are replaceably attached to or insertable in the main filter and the at least one prefilter frame or frames.

4. The filter system as recited in claim 1, wherein the connection elements are produced in two parts which are pluggable into each other.

5. The filter system as recited in claim 1, wherein the connection elements are designed symmetrically with respect to their midplane.

* * * * *